Sept. 19, 1961 R. EMANUEL 3,000,025
VEHICLE WASHING PLANT
Filed April 16, 1957 2 Sheets-Sheet 1

INVENTOR
ROBERTO EMANUEL
By Toulmin & Toulmin
Attorneys

Sept. 19, 1961 R. EMANUEL 3,000,025
VEHICLE WASHING PLANT
Filed April 16, 1957 2 Sheets-Sheet 2

INVENTOR
ROBERTO EMANUEL

By Toulmin & Toulmin
Attorneys

United States Patent Office 3,000,025
Patented Sept. 19, 1961

3,000,025
VEHICLE WASHING PLANT
Roberto Emanuel, 7 Via Canova, Turin, Italy
Filed Apr. 16, 1957, Ser. No. 653,221
Claims priority, application Italy June 3, 1953
2 Claims. (Cl. 15—21)

Vehicle washing plants are known comprising rotary brushes supported from pivotally mounted frames on opposite sides of a passageway for a vehicle to be washed, said frames being adapted to perform pivotal movements about substantially vertical axes.

It has been ascertained that plants of this type are insufficient for satisfactory washing for instance of motor buses or railway cars of which the fore portion, that is the substantially forward facing surface is inclined with respect to a transverse vertical plane, so as to confer to the vehicle a slight streamlined profile. In order to eliminate this drawback prior plants included further brushes adapted to wash the inclined vehicle portions. The arrangement of auxiliary brushes involves a high cost of installation and operation.

A further drawback of known plants consists in the fact that the brushes mounted for swinging in a known manner are incapable of cleaning the rear vehicle portion, that is, its substantially rearwardly facing surface.

This application is a continuation-in-part of application Serial No. 434,234 filed June 3, 1954, and now abandoned.

The main object of this invention is to provide a plant of the type specified above and means for assembly and control of the brushes such as to obviate the above drawbacks.

According to a feature of this invention a vehicle washing plant comprising rotary brushes supported on pivotally mounted arms on opposite sides of a passageway for a vehicle being washed, said arms being adapted to perform pivotal movements about substantially vertical axes, is characterised by a pair of opposite brushes, the pivotal movements of which are produced through engagement of the brushes with the vehicle travelling along the passageway, a further pair of opposite brushes the arms of which, with the vehicle passing therebetween, extend from their mounting means in a direction opposed to the direction of travel of the vehicle along the passageway, and control means associated with the arms of the last named pair of brushes for engaging the brushes with a rearwardly facing surface of the vehicle.

Figure 1:
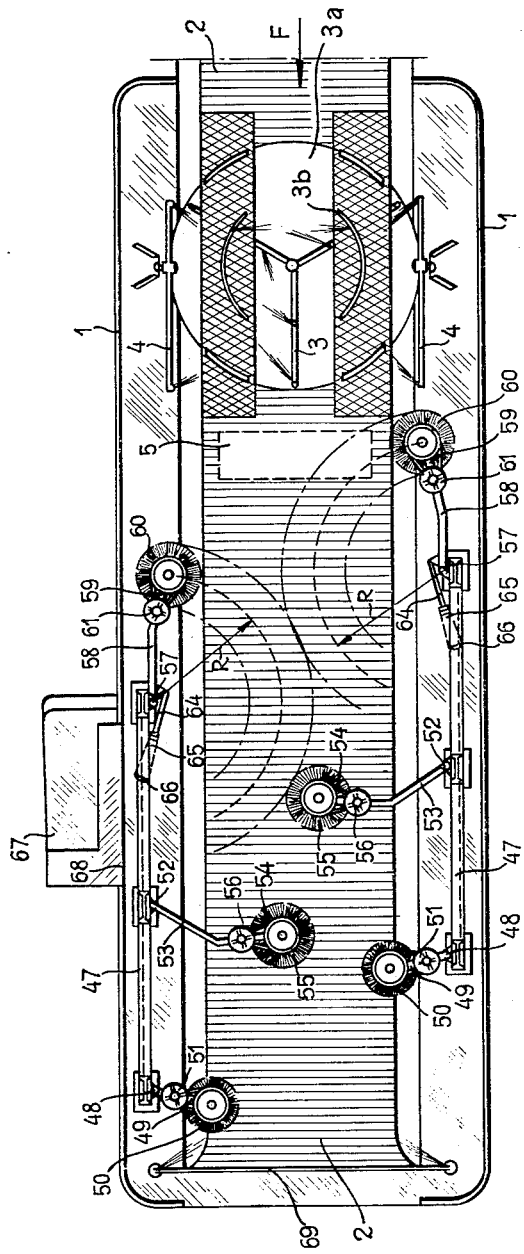
Figure 2:
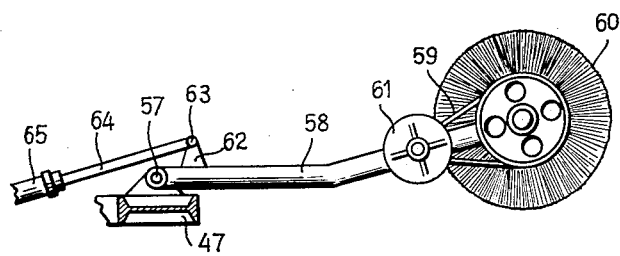
Figure 3:
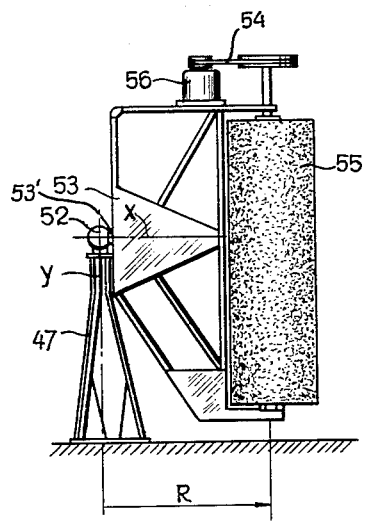
Figure 4:
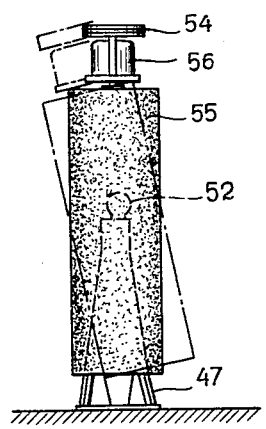

Further characteristic features of the brush arrangement in the plant according to this invention will be understood from the appended description referring to the accompanying drawings given by way of example only, wherein:

FIG. 1 is a diagrammatical plan view of the plant;
FIG. 2 is a diagrammatical view of a brush for cleaning the rear vehicle surface, and
FIGS. 3 and 4 are two diagrammatical views of one of the brush assemblies performing washing of the front vehicle surface.

In FIG. 1, 1 denotes two screening side walls enclosing a passageway 2 for a vehicle to be washed. The vehicle enters the passageway 2 from the righthand side on the figure in the direction of the arrow F and issues after washing has been completed on the lefthand side. Pairs of rotary brushes 50—50, 55—55 and 60—60 are arranged on both longitudinal sides of the passageway 2 for brushing the outer surfaces of the vehicle, as the latter moves along the passageway in the direction F. Before engagement by the brushes, the vehicle is sprayed with water by sets of rotary nozzles 3, 4, of which the sets 4 are arranged on the sides of the passageway 2 for spraying the vehicle side walls, the set 3 being located in a depression in the floor beneath the passageway and sprays the bottom portions of the vehicle through openings 3a and 3b bored in the passageway. The nozzle sets are followed by a rotary brush 5 shown on the drawing by dash lines, the said brush 5 engaging the vehicle roof after the vehicle has been largely sprayed with water from the said nozzle sets, that is, after mud and similar grit deposits have been washed away from the outer vehicle walls. After passing the brushes 5, 60, 55 and 50, the vehicle travels beneath a tubular archway 69, in which holes facing the passageway 2 are bored, the archway being fed with water for final rinsing of the vehicle.

While it will be superfluous to describe a brush construction in detail, they each comprise a cylinder rotatable about its own longitudinal axis, from the peripheral surface of which bundles of for instance "nylon" bristles extend.

Stationary carrying frames 47—47 are arranged on the sides of the passageway 2 for supporting the brushes 50, 55 and 60.

The frames 47 are referred to hereinafter as "stationary supports." Each brush 50 is rotatably mounted with its axis of rotation vertically arranged in a supporting arm 49 connected to the stationary support 47 by means of pivots 48 extending vertically (perpendicular to the plane of the figure), so that the brush 50 together with its arm 49 is capable of effecting pivotal movement about a vertical axis. The brushes 50 serve to wash the vehicle windows, and are therefore of a relatively small size in an axial direction suiting the average height of windows of vehicles such as motor buses. Each of the said brushes is rotated by an electric motor 51 mounted on a supporting arm 49.

The brushes 55, 60 are of a considerable size in an axial direction in accordance with the vehicle height. Each of the brushes 55 is rotatably mounted about its own axis in a supporting arm 53 which is connected to the stationary support 47 by means of a pivoted bearing member 52, so that the brush 55 is capable of large and practically unlimited swinging movements together with its arm 53. The brushes 55 are rotated by electric motors 56 mounted on arms 53 by means of belt drives 54, both the arms 53 for the brushes 55 and the arms 49 for the brushes 50 are pressed by spring means (not shown) tending to swing the said arms towards the position shown in FIG. 1, so that the brushes extend over the passageway 2 as shown on the drawing. The improvements in the assemblies of the brushes 55 will be described hereinunder with reference to FIGS. 3 and 4.

Each brush 60 is rotatably mounted about its own axis in a supporting arm 58 connected with the stationary support 47 by a pivoted bearing member 57, so that the brush can perform together with its arm large and practically unlimited pivotal movements about a vertical axis. The brushes 60 are rotated by electric motors 61 mounted on the arms 58 and belt drives 59 (see also FIG. 2).

According to a characteristic feature of this invention, while the brushes 55 and their supporting arms 53 extend, at the commencement of the cleaning operation in the directions shown in FIG. 1 and, as the vehicle comes between the brushes, the said brushes extend from the joints 52 substantially in a direction F in which the vehicle travels on the passageway 2, the brushes 60 and their arms 58 extend from the pivots 57 in a direction opposite the direction F, remote control means being provided for angularly displacing the arms 58 about the pivots 57 to cause the axes of rotation of the brushes 60 to move over the arcuate paths of about 180° indicated by dash lines in FIG. 1. As distinct from the brushes 50 and 55, of which the arms 49 and 53, respectively, are pressed by spring means tending to bring the brushes into cleaning engagement with the outer vehicle surfaces, the control means associated with the brushes 60 are positively driven and may comprise fluid pressure rams 65 each having their cylinder pivoted at 66 in the stationary support 47 and the rod 64 of its ram hinged at 63 to a bracket 62 which is rigidly connected to the arm 58 (FIG. 2). The rams 65 are remotely controlled by the operator in a cabin 67, which is adjacent one of the longitudinal walls 1 of the plant, the said wall being provided at the cabin 67 with a window 68, for instance of glass, so that the operator can watch from his cabin the progress of washing and operate at the proper moment the supply devices for the rams 65.

It can be clearly seen from FIGS. 1 and 2 that the brush supporting sections of the arms 53, 58 are bent towards the passageway 2, in order to clear wherever necessary the arms from any structural member of the vehicle as the brushes 55, 60 come into scouring engagement with the forward and rearward vehicle walls.

The assemblies of the brushes 55 adapted to clean the front vehicle surface will now be described in detail with reference to FIGS. 3 and 4. In the latter, the stationary support shown in FIG. 1 is diagrammatically illustrated at 47. The first bearing member 52 is mounted on the top of the stationary support 47 and is capable of rotating with respect to the stationary support 47 about a vertical axis Y. The first bearing member 52 supports a second bearing member 53' which is fixedly connected with the arm 53 supporting the brush 55, the said arm comprising a framework strong enough to support the brush 55 and its driving motor 56 and belt drive 54. The second bearing member 53' together with the frame 53 are capable of rotating without any appreciable limit with respect to the first bearing member 52 about a horizontal axis X, so that the brush 55 can perform wide and unlimited tilting movements as shown by the dash line in FIG. 4.

The structural details of the assemblies of the brushes 60 are equal to those described for the brushes 55 with reference to FIGURES 3 and 4, whereby the arms 58 of the brushes 60 too are supported from the stationary supports for wide swinging movement. The only difference is, as previously pointed out, that the arms 58 of the brushes 60 have associated therewith the manually controlled hydraulic rams 64, 65, while the arms 53 of the brushes 55 are self-adjusting.

According to a further feature of this embodiment, as clearly visible from FIG. 1, the brushes on one side of the passageway 2 are staggered lengthwise of the passageway with respect of the brushes on the opposite side. In prior plants brushes were aligned transversely of the passageway, so that the brushes in this alignment interfered with one another during operation, this being one of the reasons why additional brushes were employed for brushing the front and rear vehicle surfaces, while brushes similar to the brushes denoted by 55 in this plant merely cleaned the vehicle side walls. By the staggered arrangement as shown, the brushes such as 55 and 60 can extend from their pivots 52 over a substantial length above the passageway 2. As is shown in FIGS. 1 and 3, each of the arms 58, 53 has a radius R which is sufficient for the brush to reach a vertical longitudinal mid-plane of the passageway 2, whereby the zone of operation of one brush on the rear or front surface of the vehicle is in part superposed on the zone of operation of the opposite brush, as will be more clearly explained hereinafter.

The above described plant operates as follows:

Assuming the vehicle to be washed comprises an inclined front surface such as to afford a more or less streamlined profile, and a similar rear surface, the vehicle enters the passage 2 from the right-hand side of FIG. 1 in the direction of the arrow F. All the brushes occupy the positions indicated in the figure. As the vehicle travels along the passageway, it is first sprayed with water by the nozzle sets 3, 4, the water jets issuing from the said nozzles removing from the vehicle surfaces solid deposits, such as dust or mud. As the vehicle travels farther to the left on the figure, the vehicle roof comes into cleaning engagement with the brush 5 in a manner known per se. The front vehicle surface successively comes past the brushes 60 into cleaning engagement with the near brush 55. Since the front vehicle surface is inclined to the vertical, the brush 55 tilts about its horizontal axis X and fits the whole front surface spontaneously and accurately, whereby the said surface is brushed from its middle region. On further travel of the vehicle, the brush 55 is further spontaneously self-orientated about the axis X, its framework arm 53 performing in the meantime an angular movement about the vertical axis Y, on account of the fact that the vehicle presses the brush 55. The region of engagement of this brush is therefore increasingly displaced towards one vehicle side, the brush 55 ultimately engaging the lateral vehicle wall. It is immaterial whether this lateral wall is vertical or inclined, the operation of the plant being unaffected thereby, inasmuch as the brush 55 can tilt about its axis X and swing about the axis Y, thereby accurately suiting the profile of the said lateral surface.

In the meantime the operator watching operation of the plant from the cabin 67 through the window 68 shall have operated the devices actuating the rams 65 for the brushes 60, whereby the latter brushes come on both sides into cleaning engagement with the lateral vehicle surfaces, with their arms still extending in a direction opposed to the direction of travel F of the vehicle. The front vehicle surface then comes into engagement with the second brush 55, which operates similarly as described with reference to the first brush 55; however, the second brush 55 operates on the opposite vehicle side after starting from a middle region on the front vehicle surface. Since the brushes 55—55 are staggered as described, the second brush operates on the said middle region after the first one has moved away therefrom to one side, so that the whole front vehicle surface can be cleaned without the brushes interfering with each other.

Reverting to the operation of the brushes 60 it is pointed out that, as the rear vehicle surface becomes aligned with the first one of the said brushes, the ram 65 for the brush angularly moves its arm 58 about the pivot 57, whereby the brush is positively operated to engage the said rear surface. As the vehicle travels farther, the region on the rear vehicle surface engaged by the brush gradually displaces towards the centre of the said surface, whereupon it is displaced back to one side, as will be easily understood by considering the brush path as indicated in FIG. 1. When the region of engagement is approximately at the centre of the rear surface, the other of the two brushes 60 engages the said surface starting from a lateral region and operates similarly to the first brush 60. On completion of the action of the brushes 60 on the rear vehicle surface, the operator reverses the fluid flow to the rams 65 thereby returning the brushes to their original position as shown in FIGURE 1.

The advantage of the described arrangement of the brushes 60 with respect to the brushes 55 will be obvious on considering on the drawing that the brushes 55 by their arms 53 are incapable of suiting the rear surface of a motor vehicle owing to the fact that, as soon as a lateral edge of the rear surface is adjacent one of the brushes 55, the brush is no longer retained by the vehicle side wall against the action of the spring means pressing its arm 53, and becomes disengaged from any vehicle surface. On the other hand, it will be obvious that the plant according to this invention affords an efficient washing and cleaning of the front and rear surface of motor vehicles without employing complicated or expensive means, in accordance with the purposes defined by the preamble. The vehicle side windows are subsequently cleaned by the brushes 50 and the vehicle is finally rinsed as it passes under the arch 69.

What is claimed is:

1. In a vehicle washing plant, a passageway for the vehicle having an entrance and exit end; a pair of rotary brushes at opposite longitudinal sides of the passageway; mounting means for each brush comprising a stationary support and an arm in which the brush is rotatably supported from the support for a swinging movement about a vertical axis, the arm having a radius sufficient for the brush to reach a longitudinal mid-plane of the passageway; the two supports being staggered lengthwise of the passageway with respect to each other whereby a brush can effectively engage during its swinging movement a rearwardly facing surface on the body of a vehicle traveling through the passageway in advance of the opposite brush; said arms normally extending toward the entrance end of the washing plant and a control means associated with each arm for controlling swinging movements of the arm within a range including a position in which the arm extends from its associated support towards the entrance end to a position wherein the brush extends towards the exit end of the passageway.

2. A vehicle washing plant as claimed in claim 1, wherein said arm has a brush supporting portion offset toward the passageway.

References Cited in the file of this patent
UNITED STATES PATENTS

| | | |
|---|---|---|
| 1,654,664 | Parker | Jan. 3, 1928 |
| 1,968,986 | Blackhall et al. | Aug. 7, 1934 |
| 2,242,692 | Yingling | May 20, 1941 |
| 2,253,609 | Byron et al. | Aug. 26, 1941 |
| 2,579,866 | Rousseau | Dec. 25, 1951 |